United States Patent [19]

Kumar

[11] Patent Number: 5,521,369
[45] Date of Patent: May 28, 1996

[54] CARD SHAPED COMPUTER PERIPHERAL DEVICE

[75] Inventor: Rajendra Kumar, Akron, Ohio

[73] Assignee: Khyber Technologies Corporation, Fairlawn, Ohio

[21] Appl. No.: 280,087

[22] Filed: Jul. 25, 1994

[51] Int. Cl.[6] .................................................. G06K 7/10
[52] U.S. Cl. ............................................ 235/472; 235/462
[58] Field of Search ................................. 235/472, 462; 439/76

[56] References Cited

U.S. PATENT DOCUMENTS

| | | | |
|---|---|---|---|
| 4,251,798 | 2/1981 | Swartz et al. | 340/146.3 |
| 4,387,297 | 6/1983 | Swartz et al. | 235/462 |
| 4,621,189 | 11/1986 | Kumar et al. | 235/472 |
| 4,943,868 | 7/1990 | Yoshinaga et al. | 358/403 |
| 5,021,642 | 6/1991 | Chadima, Jr. | 235/708 |
| 5,023,824 | 6/1991 | Chadima, Jr. | 364/472 |
| 5,107,100 | 4/1992 | Shepard et al. | 235/472 |
| 5,189,291 | 2/1993 | Siemiatkowski | 235/472 |
| 5,294,782 | 3/1994 | Kumar | 235/462 |
| 5,299,940 | 4/1994 | Uenaka | 439/76 |
| 5,330,360 | 7/1994 | Marsh et al. | 439/76 |
| 5,391,083 | 2/1995 | Roebuck | 439/76 |

OTHER PUBLICATIONS

Handheld PCMCIA Scanner—Mustek Inc. IC Card Systems & Design—May/Jun. '94.
PCMCIA Cards are Finding New Slots–Plug In—Apr. 18, 1994.
Don't Write Off Pen Systems—Electronic Business Buyer—Apr. 1994.

*Primary Examiner*—Harold Pitts
*Attorney, Agent, or Firm*—Sand & Sebolt

[57] ABSTRACT

A peripheral device adapted to be releasably secured to a host computer of the type having a standardized card slot. The peripheral device includes a card shaped portion attached to a module portion which houses an/input/output device. In one embodiment, the input/output device is an item identification reader, and the card shaped portion and module portion are integrally connected. Further, the card shaped portion is fitted into the card slot in the host computer to secure the peripheral device within the card slot to permit one handed operation of the host computer/peripheral device combination. The first embodiment also provides an electronic interface between the host computer and the peripheral device. In a second embodiment, the card shaped portion does not provide an electronic card interface. The card shaped portion and card slot merely engage to secure the peripheral device within the card slot. In this embodiment, the electronic interface is provided via a separate serial port connection. In a third embodiment of the invention, the card shaped portion and module portion are releasably attached to provide both one handed and two handed operation. A zigzag ribbon cable is utilized to maintain electrical connection between the module portion and card shaped portion when the respective portions are not attached to one another. A second and third embodiment may be combined to provide a card shaped portion releasably attached to a module portion wherein the electronic interface is provided via a separate serial port connection.

9 Claims, 4 Drawing Sheets

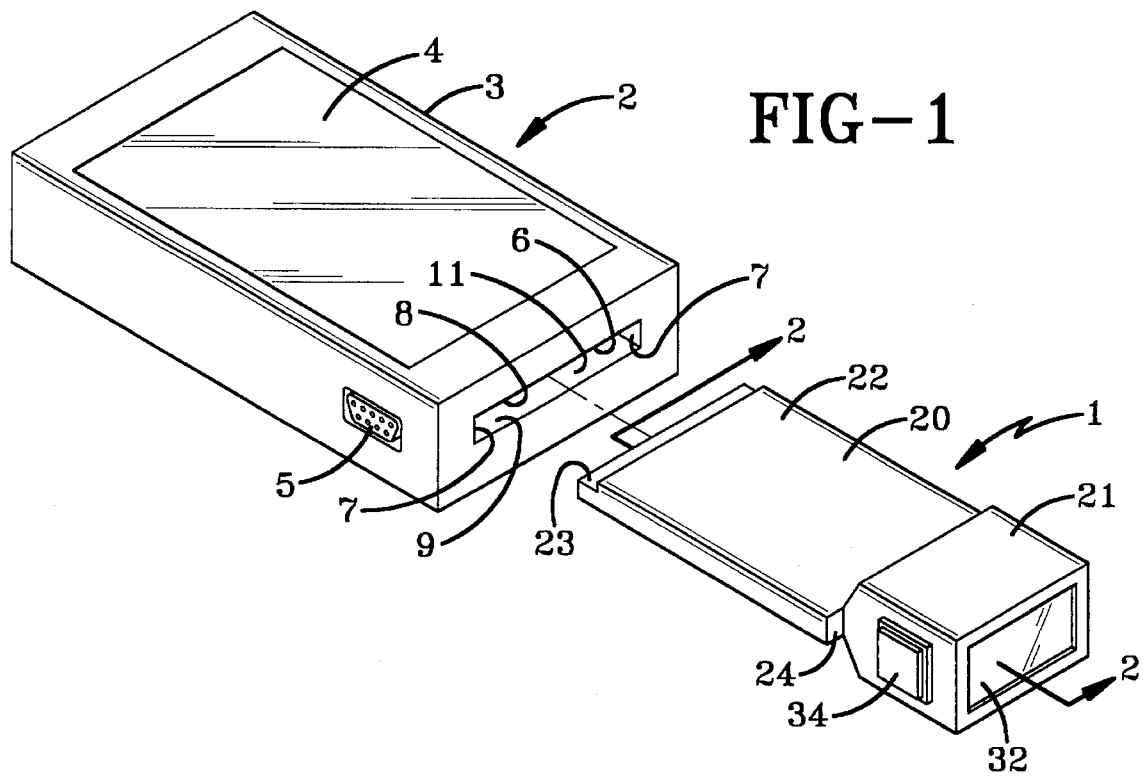
FIG-1
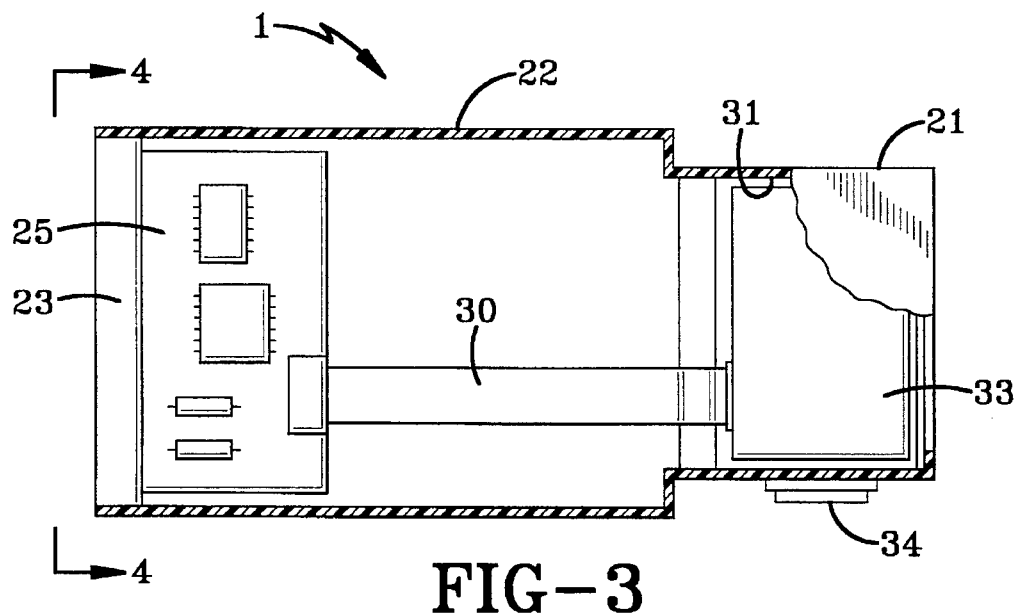
FIG-2
FIG-3

CARD SHAPED COMPUTER PERIPHERAL DEVICE

BACKGROUND OF THE INVENTION

1. Technical Field

The invention relates generally to a peripheral device for use with a host computer. More particularly, the invention relates to a peripheral device having a card shaped interface. Specifically, the invention relates to a peripheral device having a card shaped interface which is accepted in an industry standard card slot and which is releasably and rigidly supported from the host computer via the card shaped interface.

2. Background Information

Since the advent of the personal computer, manufacturers and industrial users have continually developed faster, smaller and more versatile machines, including portable computers that are dedicated to perform a specific function such as word processing, data collection or item identification. Alternatively, portable computers may be all purpose computing machines capable of running a variety of types of software programs. These portable personal computers may interact with a variety of portable and stationary peripheral input/output devices such as printers, light pens, image scanners, video scanners, etc. Moreover, these computers usually have an electric power cord for receiving power from a standard electric outlet, as well as a battery pack for powering the unit when an electrical outlet is unavailable or is inconvenient. The portability and versatility of portable computers, in combination with the ever decreasing size and weight of these machines, has attracted a significant number of users, with the number of users expected to dramatically increase in the near term.

Portable computers have progressed significantly, and the industry has recently enjoyed the introduction of palm top computers and pen based systems. One example of such a system is the Newton™ personal digital assistant (PDA) manufactured by Apple Computer Inc. of Cupertino, Calif. Another such device, Envoy™, is offered by Motorola Inc., of Schaunburg, Ill. PDAs are general purpose computers that often include communication capabilities such as fax boards and modems, as well as software packages including word processing, note taking, handwriting recognition, and daily planners. The costs of these versatile portable computers continue to decrease as they are becoming increasingly familiar in all areas of business and personal life, and the manufacturers enjoy savings due to the economies of scale associated with mass production.

Alternatively, dedicated computers are designed to fill a specific need. One such device is manufactured by Symbol Technologies Inc. of Bohemia, N.Y. and is the subject matter of U.S. Pat. No. 5,107,100. While devices of this type offer added convenience to the end user, these devices are generally user specific, and thus are not mass produced and do not enjoy the economies of scale associated with mass production. Thus, these devices are somewhat more costly than the mass produced PDA counterpart.

Both general purpose and dedicated computers generally include one or more electronic interfaces such that one or more of a variety of peripherals may be electrically attached to the host computer. Serial ports are one type of connector wherein a cable extends between the host computer serial port and the peripheral providing electronic communication between the host machine and selected peripheral.

A second type of electronic interface commonly available is the PCMCIA (Personal Computer Memory Card International Association) slot. PCMCIA slots permit the user to add additional memory via the insertion of a PCMCIA memory card into the slot. Such additional memory may then be removed and used in a separate computer system allowing multiple systems to operate on a single data set. PCMCIA interfaces continue to grow in popularity, and a San Hosea based market research firm has estimated that half of the seven million notebook computers shipped in 1993 contained PCMCIA slots, and that by 1995, 13 million notebook computers will be shipped and 97% of them will be equipped with PCMCIA slots. As such, PCMCIA slots are quickly becoming standard in both PDA, lap top and personal desk top computers, and the popularity of the PCMCIA interface is expected to dramatically increase in the near term.

The primary benefit of the PCMCIA interface and similar card interface slots is that the cards are relatively low energy users, are relatively small in size, are often completely enveloped by the host computer and are universally standardized. PCMCIA card specifications are included in PCMCIA release number 2.01 and therefore, are not described herein.

One peripheral which is often associated with portable computers are item identification readers such as laser scanners for bar codes and radio frequency identification readers for RFID tags. Traditionally, these scanners are handheld devices which are connected to a host device such as a personal computer or a handheld computer via an interface cable extending between the above referenced serial port, and the peripheral device. One such device is a handheld laser scanner described in U.S. Pat. No. 4,387,297. The laser scanner optically receives the code, and the host device in turn processes and stores the scanned item identification number. Such devices have the advantage of making use of general purpose host computers, and thus are relatively inexpensive. However, they require both of the users hands during operation, and thus are not convenient to use when only one hand is free to hold the host computer/peripheral device combination.

Alternatively, the device described in U.S. Pat. No. 5,107,100 has the scanner integrated within the handheld device to form a computer with a dedicated function.

The portable point of sale device described in U.S. Pat. No. 5,294,782, to Kumar is also a dedicated machine. Another device which includes a built in scanner is described in U.S. Pat. No. 4,943,868. These devices do not provide a one piece scanning system which use an off-the-shelf general purpose host computer. Such dedicated computers are effective in carrying out the specific function for which they are designed. However, these computers are significantly more expensive than the two piece solution, as these devices do not utilize mass produced host computers.

Mustech Inc. has also introduced the Plug-N-Scan portable scanning system where the scanner interfaces with a PCMCIA 2.0 slot. The unit draws power from the host system and is compliant with TWAIN compatible scanning software which bridges various application software packages with scanner hardware. In essence, the Plug-N-Scan portable scanning system utilizes a PCMCIA electrical connection, and a cable extends from the PCMCIA electrical connect card to the scanner module. This system, while presumably adequate for the purpose for which it was intended, still does not mechanically support the scanner and provide a one piece host computer/peripheral device combination, nor does it provide for one handed operation.

Thus, while a number of prior art general purpose and dedicated computing devices have been developed, and are presumably adequate for the purpose which they are intended, these prior art devices fail to provide item identification scanning systems which employ a cost effective general purpose host computer, and also offer the one piece convenience of integrated scanning systems such that the user employs only one hand to hold the device. Further, the prior art peripherals will not electronically interface and be detachably mounted to the general purpose host computer, thus permitting the peripheral module to be mounted to the host computer when in use, and removed from the general purpose host computer when not in use.

Therefore, the need exists for a peripheral device which will electronically interface with a general purpose host computer and also will removably attach to the host computer thus creating a one piece handheld computer which includes the peripheral's capability, and which peripheral may be removed from the general purpose host computer when not in use.

The need also exists for an item identification scanning system which employs a cost effective general purpose host computer and also offers the one piece convenience of integrated scanning systems to permit one handed use.

Objectives of the invention include providing a peripheral device which may be removably secured to a host computer and electronically connected thereto.

A further objective is to provide a one piece peripheral device which includes a card shaped portion for extending into a standardized card slot.

Yet another objective is to provide a peripheral device wherein the card shaped portion extends into the card slot of the host computer to support the peripheral device.

A further objective of the invention is to provide a peripheral device wherein the card shaped portion electronically interfaces with the card slot.

Another objective of the invention is to provide a peripheral device which is cable connected electronically to the host computer outside the card slot.

A still further objective is to provide a peripheral wherein the module includes an item identification reader.

Yet another objective of the invention is to provide a peripheral wherein a module portion is removably attached to the card shaped portion such that when the module portion is mounted to the card portion, the user may operate the host computer and peripheral with one hand, and when the module portion is removed from the card shaped portion, the user can use two hands to operate the combination host computer/peripheral device.

A still further objective of the invention is to provide an item identification scanning system which employs a cost effective general purpose host computer, with a peripheral item identification scanner electronically connected to, and removably secured to, the host computer.

Yet another objective of the invention is to provide a peripheral device which is PCMCIA compatible.

A still further objective is to provide such a card shaped peripheral device which is of a simple construction, which achieves the stated objectives in a simple, effective and inexpensive manner, and which solves problems and satisfies needs existing in the art.

These and other objectives and advantages of the improved invention are obtained by the peripheral device, the general nature of which may be stated as including a card shaped portion adapted to be received within the card slot; a module portion connected to said card shaped portion; electrical connector means adapted for electronically connecting said peripheral device to the host computer; mechanical securing means for securing said card shaped portion within the slot; and item identification reader means housed within said module portion for reading an item identification tag.

BRIEF DESCRIPTION OF THE DRAWINGS

The preferred embodiments of the invention, illustrative of the best modes in which applicant has contemplated applying the principles, are set forth in the following description and are set forth in the drawings and are particularly and distinctly pointed out and set forth in the appended claims.

FIG. 1 is a diagrammatic exploded perspective view of a host computer and a first embodiment of the peripheral device of the present invention;

FIG. 2 is a sectional view of the peripheral device taken substantially along line 2—2, FIG. 1;

FIG. 3 is a top plan view of the peripheral device shown in FIG. 2 with portions cut away and in section;

Similar numerals refer to similar parts throughout the drawings.

DESCRIPTION OF THE PREFERRED EMBODIMENTS

Figure 4:
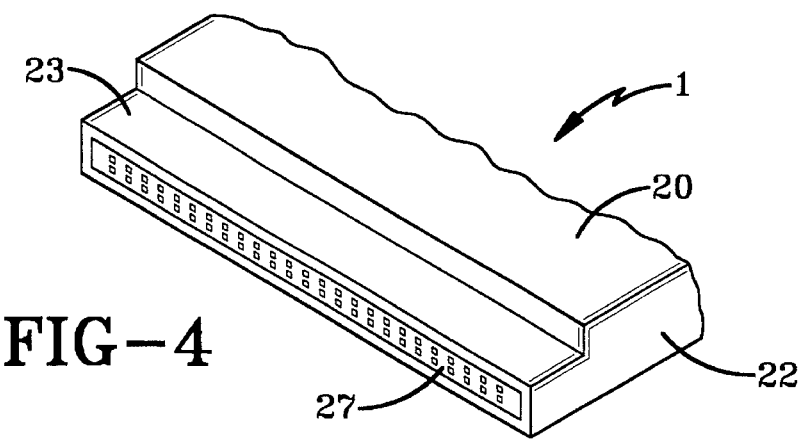
FIG. 4 is an enlarged perspective view of the peripheral device with portions cut away.

An improved peripheral device of the invention is indicated generally at 1, and is adapted to be mounted on a commercially available host computer shown generally at 2 in FIG. 1.

Host computer 2 may take a variety of configurations varying from a standard desk top personal computer, to a lap top or a palm top computer, to a newly available personal digital assistant (PDA), discussed in the background of the invention. While the present invention is utilized with all of the above mentioned host computers, the exemplary embodiment in FIG. 1 utilizes a PDA type personal computer with the understanding that the remaining computers may be utilized without departing from the spirit of the present invention. Host computer 2 is well known in the art, and as such, only a brief description of the components necessary for a complete understanding of the invention will be given below.

Host computer 2 generally includes a housing 3 and a display screen 4. Display screen 4 may also include a touch pad (not shown), positioned above display screen 4 such that screen 4 operates as an input device. Host computer 2 also includes an electrical interface port, commonly referred to as a serial port 5. Similarly, host computer 2 includes a standardized card slot 6. While card slot 6 may take a variety of standard configurations without departing from the spirit of the present invention, the preferred embodiment envisions the use of a standard PCMCIA card slot.

Figure 6:
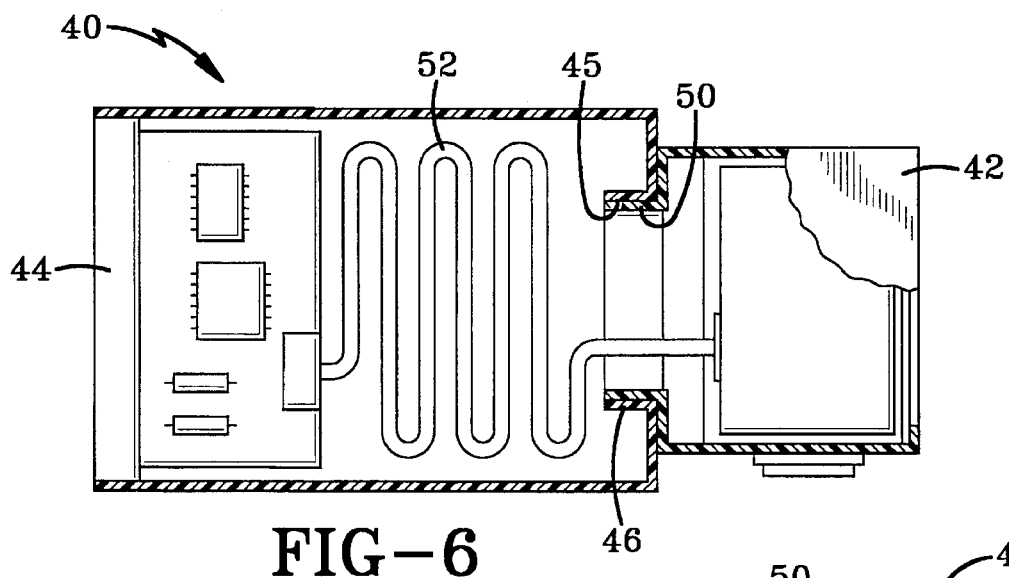
FIG. 6 is a top plan view of the second embodiment of the present invention with portions cut away and in section.
Figure 7:
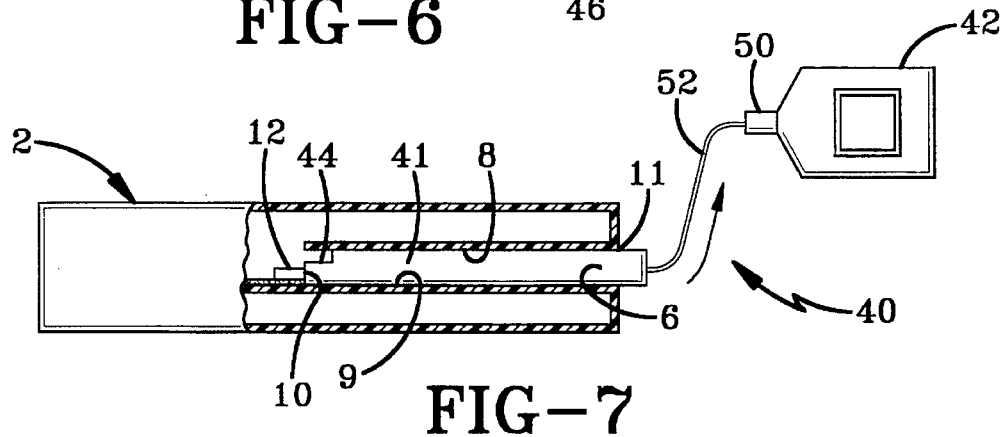
FIG. 7 is an elevational view with portions in section of the second embodiment of the present invention shown installed in a host computer, with the module portion removed from the card shaped portion and connected thereto by a cable.

Referring to FIGS. 1 and 7, PCMCIA card slot 6 is defined by a pair of parallel sidewalls 7, a top wall 8, a bottom wall 9, and an end wall 10. Card slot 6 is accessed through an access opening 11. End wall 10 further includes a standard PCMCIA electrical interface 12 (FIG. 6) with corresponding electrical pin connectors (not shown).

In accordance with one of the main features of the first embodiment of the invention, peripheral device 1 includes a card shaped portion 20 (FIG. 1), and a module portion 21 integrally connected to card shaped portion 20. Card shaped portion 20 includes a housing 22 having a first end 23, and a second end 24. Card shaped portion 20 is hollow (FIG. 2), and houses a PC board 25 which contains PCMCIA interface circuitry 26. PC board 25 also includes PCMCIA interface 27 (FIG. 9) for electronically connecting to the complementary shaped PCMCIA electrical interface 12. PC board 25 is also connected to module portion 21 via a ribbon cable 30 that extends along the length of, and within card shaped portion 20 of peripheral device 1.

Module portion 21 is also hollow, and has an interior cavity 31 and a window 32. Interior cavity 31 may house a variety of input/output devices, all of which are envisioned by the present invention. However, laser scanner 33 is shown in the preferred embodiment (FIG. 2). Laser scanner 33 is commercially available as model SE-1000 from Symbol Technologies Inc. of Bohemia, N.Y. Laser scanner 33 may also be a radio frequency scanner or a video scanner without departing from the spirit of the present invention. Laser scanner 33 is positioned such that the scan engine may scan and decode bar codes positioned adjacent window 32. Moreover, ribbon cable 30 attaches to laser scanner 33 to transmit data received by laser scanner 33 to PC board 25. Laser scanner 33 may be actuated in a variety of ways including software activation and hardware activation with a scanner activation button 34 being shown in the preferred embodiment (FIG. 1).

Referring to the operation of peripheral device 1, when card shaped portion 20 is inserted through access opening 11, it will be guided by parallel spaced apart sidewalls 7 until it is entirely received within card slot 6. PCMCIA interface 27 will contact PCMCIA interface 12 to provide electrical communication between the peripheral device 1 and host computer 2. Moreover, the interface between PCMCIA interfaces 12 and 27 will provide sufficient mechanical holding force to secure card shaped portion 20 within card slot 6. As such, the remaining portion of peripheral device 1, the module portion extending outwardly from card slot 6, is mechanically retained to host computer 1, and electrically connected thereto.

Thus, in accordance with one of the main features of the invention, peripheral device 1 includes a scanner module secured to the host computer such that the host computer is held in one of the user's hands for convenient use. Further, the scanner may be conveniently removed from the host computer when scanner functions are not necessary thereby further decreasing the overall size and weight of the host computer/peripheral device combination and further permitting the general purpose host computer to perform a variety of functions apart from the dedicated scanning function.

Figure 5:
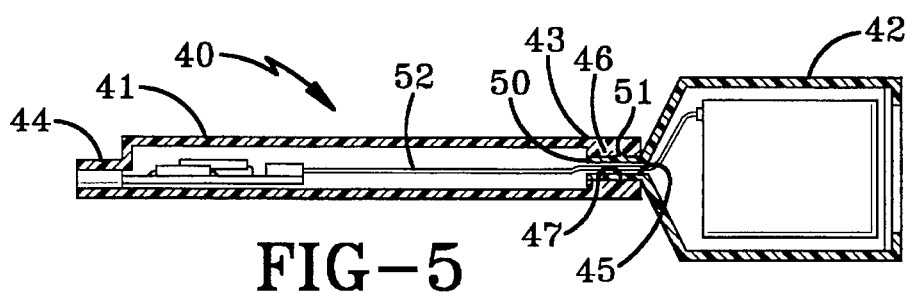
FIG. 5 is a sectional view of a second embodiment of the present invention.

A second embodiment of the present invention is shown in FIGS. 4–6, and is indicated generally at 40. Peripheral device 40 includes a card shaped portion 41 and a module portion 42. Peripheral device 40 is similar to peripheral device 1 except that card shaped portion 41, and module portion 42 are separable. Specifically, a first end 43 opposite a second end 44 of card shaped portion 41 includes a mounting bay 45. A lip 46 extends inwardly from first end 43 toward second end 44 and circumferentially around mounting bay 45 and includes a plurality of recesses 47. Module portion 42 includes a mounting boss 50 complementary shaped to mounting bay 45. Moreover, the exterior wall of mounting boss 50 includes a plurality of detents 51 to operatively engage recesses 47 and secure module portion 42 to card shaped portion 41.

In accordance with one of the main features of the invention, ribbon cable 30 of the first embodiment, has been replaced with a zigzag ribbon cable 52.

In operation, the insertion of peripheral device 40 into card slot 6 is identical to that described above with respect to the insertion of peripheral device 1 into card slot 6. As such, the user may operate peripheral device 40 just as peripheral device i is operated.

However, after peripheral device 40 is inserted into card slot 6, module portion 42 may be detached from card shaped portion 41 for two handed operation. Specifically, the user may grasp module portion 42, overcome the detent locking engagement 51, and detach module portion 42 from card shaped portion 41. Zigzag ribbon cable 52 will pull out of the hollow interior of card shaped portion 41 to maintain an electrical connection between portions 41 and 42 (FIG. 7). When the user no longer wishes to perform two handed scanning, the module portion 42 may be reassembled with the card shaped portion 41 for one handed operation. Zigzag ribbon cable 52 has sufficient memory such that it will reassume its original unstressed position within the hollow interior of card shaped portion 41.

In this manner, the user may operate the system in a one handed mode when scanning identification codes on small items, or in other operations where one handed operation is more convenient. However, if necessary, two handed scanning is possible. For example, the user may wish to use two handed scanning operation when scanning identification codes on large items, or where the code is located in such a manner that movement of the host computer along with the scanning unit is inconvenient, or not possible. Two handed operation is shown specifically in FIG. 7.

Figure 8:
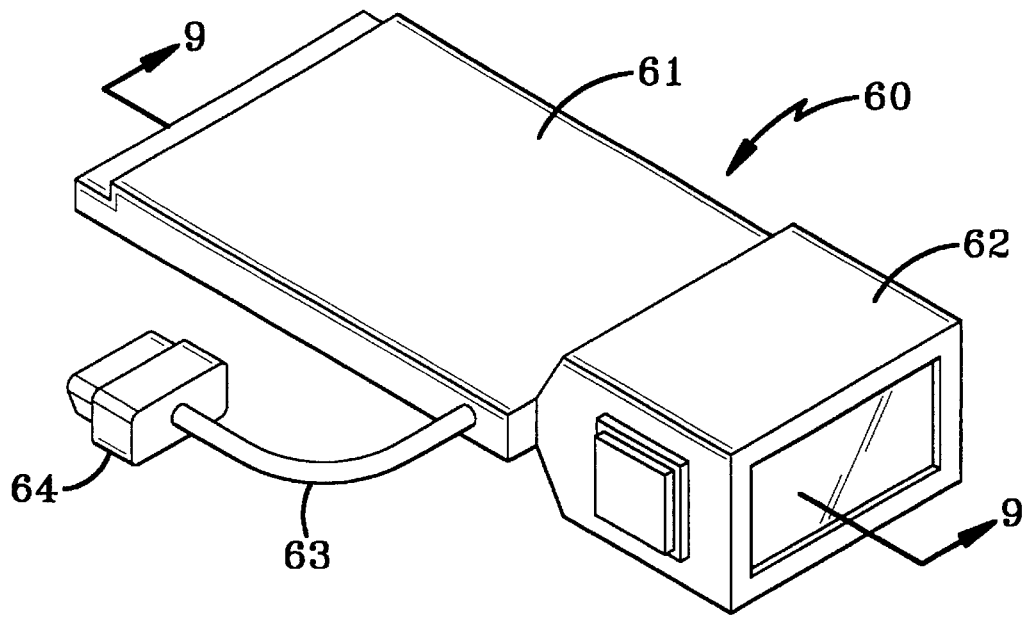
FIG. 8 is a perspective view of a third embodiment of the present invention.
Figure 9:
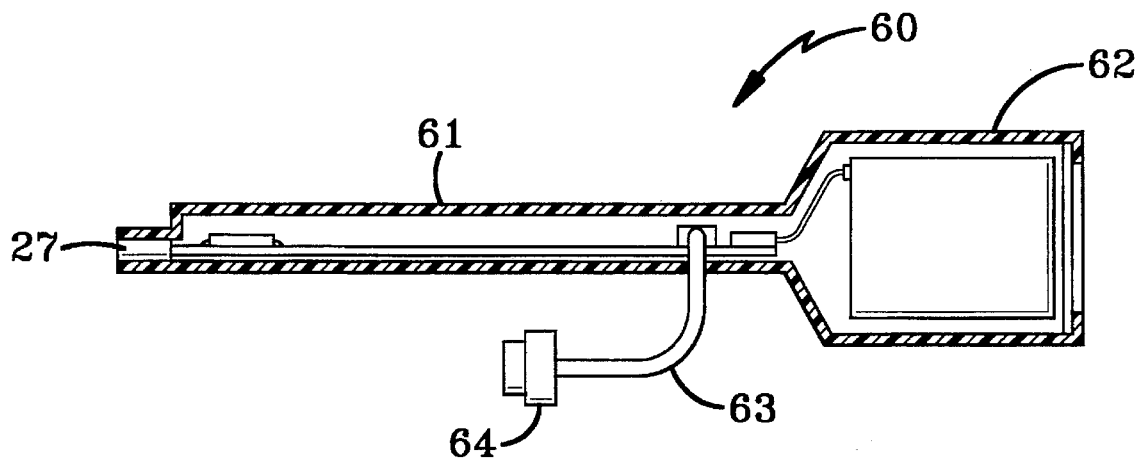
FIG. 9 is a sectional view of the third embodiment taken along line 9—9, FIG. 8.

A third embodiment of the present invention is shown in FIGS. 8 and 9 and is indicated generally at 60. Peripheral device 60 is similar to peripheral devices 1 and 40, in that it includes a card shaped portion 61, and a module portion 62. However, and referring specifically to FIG. 8, card shaped portion 61 merely secures the peripheral device 60 within card slot 6. Card shaped portion 61 does not provide a PCMCIA electrical interface, as is the case in the first two embodiments. Rather, peripheral device 60 includes an interface cable 63, with one end electronically connected to peripheral device 60, and another end providing a serial connector 64. Serial connector 64 will communicate with a similarly situated serial port 5 (FIG. 1) on host computer 2.

Thus, in accordance with one of the features of this third embodiment, the PCMCIA card shaped portion 61 merely operates as a means to physically secure the peripheral device 60 to host computer 2. All electrical interconnections are made through standard serial interface 64 which is common to virtually all personal, portable and handheld computers. This option permits one handed use without the need for a PCMCIA electrical interface on card shaped portion 61.

As should also be apparent to one of ordinary skill in the art, the advantage of the serial interface over the previously described PCMCIA interface is that serial interface is significantly less expensive to implement since many scanners come with a serial interface, and hence can communicate with the host directly instead of communicating through a PCMCIA slot.

Figure 10:
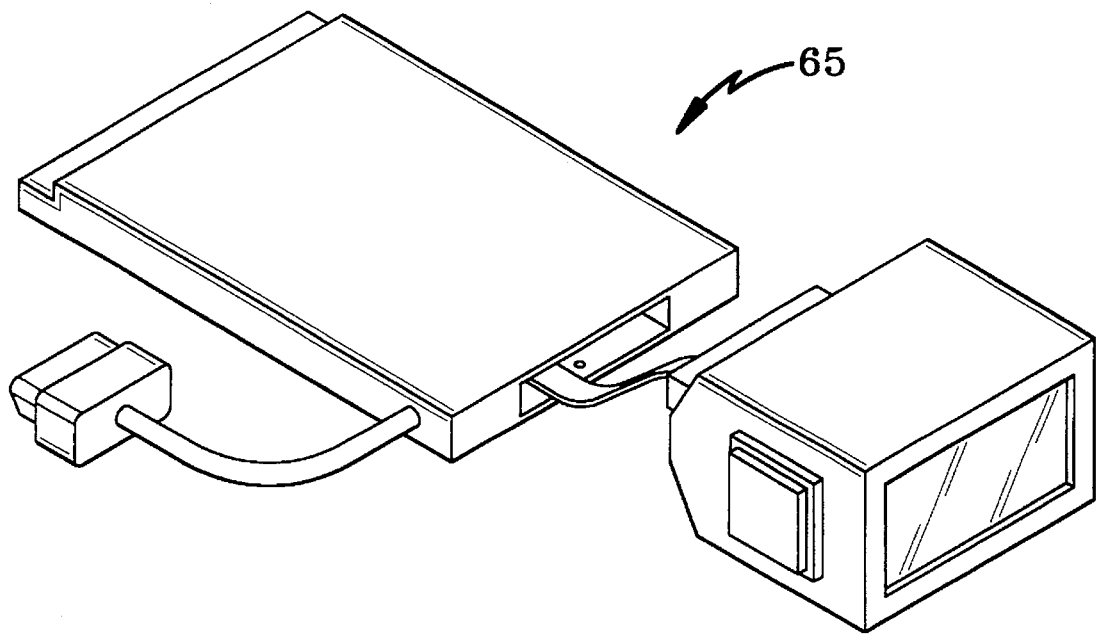
FIG. 10 is a perspective view of a fourth embodiment of the present invention, shown with the module portion removed from the card shaped portion.

It should also be apparent to one of ordinary skill in the art that the use of serial interface 64 can be combined with the removability of the module portion from the card shaped portion in order to provide a peripheral device which can be used as both a one piece and a two piece peripheral device, but which is serial connected to the host computer. Such a device is shown specifically in FIG. 10 as the fourth embodiment of the present invention, and is indicated generally at 65.

Figure 11:
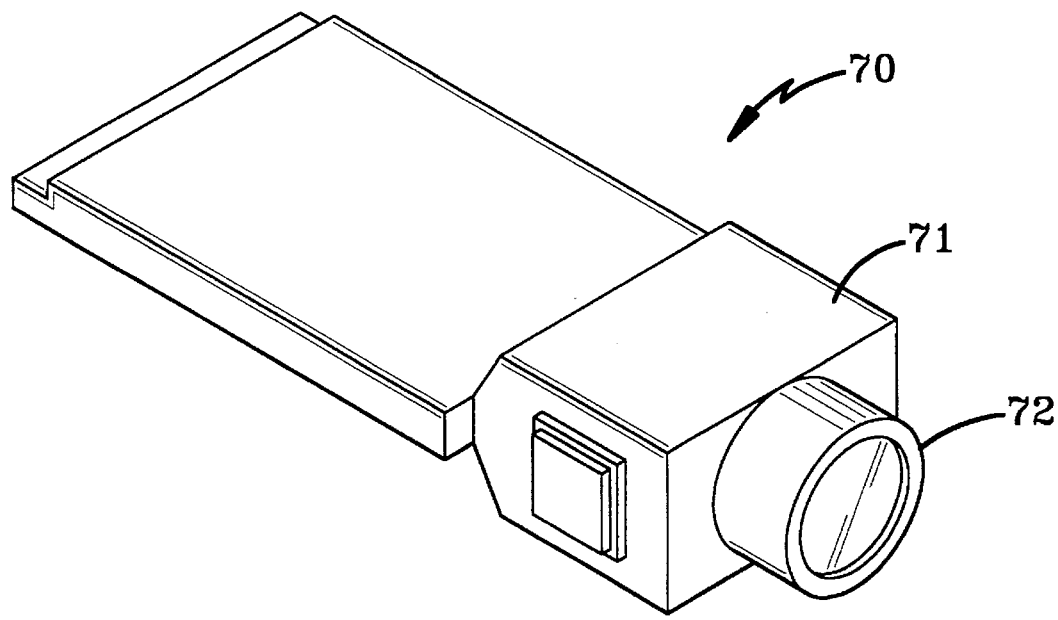
FIG. 11 is a perspective view of a fifth embodiment of the present invention.

The fifth embodiment of the invention is shown in FIG. 11, and is indicated generally at 70. Peripheral device 70 is constructed exactly the same as the first three embodiments, except that a module portion 71 includes a video scanner 72, rather than an image scanner as shown in the first three embodiments. As discussed above, a variety of peripherals may be utilized with the present invention, with image and video scanners being exemplary embodiments.

In summary, peripheral device 1 provides a card shaped portion which is secured within a standard card slot in a mass produced general purpose host computer 2. The host computer/peripheral device combination is then available for convenient one handed operation while avoiding the high cost associated with dedicated machines that perform identical functions.

Peripheral device 40 provides all of the above, but also provides further flexibility in that when necessary, module portion 42 may be detached from card shaped portion 41, to provide two handed operation when necessary, or when one handed operation would be tiring to the user.

Peripheral device 60 provides a card shaped portion 61 and module portion 62 integrally connected. Peripheral device 60 also provides a standard serial connection 64 to further reduce the cost of peripheral device 60, as no electrical connection is made via the interconnection of card shaped portion 60 and card slot 6. Rather, card shaped portion is merely mechanically secured within card slot 6 of host computer 2.

Peripheral device 65 is similar to peripheral device 60 except that card shaped portion 61 and module portion 62 are releasably connected similar to peripheral device 40.

Accordingly, the improved peripheral device is simplified, provides an effective, safe, inexpensive, and efficient device which achieves all of the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved peripheral device is constructed and used, the characteristics of the construction, and the advantageous, new and useful results obtained; the new and useful structures, devices, elements, arrangements, parts and combinations, are set forth in the appended claims.

I claim:

1. A peripheral device adapted to be removably attached to a host computer of the type having a card slot, said peripheral device comprising:

a card shaped portion adapted to be received within the card slot;

a module portion removably attached to said card shaped portion;

first electrical connector means for connecting said card shaped portion to said host computer;

first mechanical securing means for securing said card shaped portion within said slot;

second mechanical securing means for securing a module portion to said card shaped portion;

a second electrical connection extending between the card shaped portion and the module portion sufficient to permit the continued electronic communication between the card shaped portion and the module portion when the module portion is both mechanically secured to the card shaped portion, and has been removed from the card shaped portion; and input/output means housed within said module portion.

2. A peripheral device as defined in claim 1 in which at least a portion of the card shaped portion is hollow; and in which the second electrical connection means is housed within said hollow portion.

3. A peripheral device as defined in claim 2 in which the second electrical connection means is a zigzag ribbon cable.

4. A peripheral device as defined in claim 3 in which the zigzag ribbon cable has memory to return to its original position within the hollow card shaped portion of the peripheral device when the module portion is reattached to said card shaped portion.

5. A peripheral device as defined in claim 1 in which the second mechanical securing means includes a plurality of recesses carried by one of the card shaped portion and module portion, and an equal number of complementary shaped protrusions extending outwardly from the other of the card shaped portion and module portion thereby forming a detent engagement with said recesses carried by said one of the card shaped portion and module portion.

6. A peripheral device as defined in claim 1 in which the first electrical connector means includes electrical contacts carried by the card shaped portion; and in which electrical contacts are adapted to communicate with similarly positioned electrical contacts within the card slot.

7. A peripheral device as defined in claim 1 in which the first electrical connector means includes a cable extending outwardly from the peripheral device; and in which the cable includes an electrical fitting at one end thereof adapted to communicate with an electric connector carried by the host computer.

8. A peripheral device as defined in claim 1 in which the card shaped portion is sized substantially the same as a standard PCMCIA card.

9. A peripheral device as defined in claim 1 in which the input/output means is an item identification reader housed within said module portion adapted for reading an item identification tag.

\* \* \* \* \*